United States Patent
Yang (10) Patent No.: US 11,222,011 B2
(45) Date of Patent: Jan. 11, 2022

(54) BLOCKCHAIN-BASED TRANSACTION PROCESSING

(71) Applicant: Advanced New Technologies Co., Ltd., Grand Cayman (KY)

(72) Inventor: Dayi Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 79 days.

(21) Appl. No.: 16/805,331

(22) Filed: Feb. 28, 2020

(65) Prior Publication Data

US 2020/0201846 A1  Jun. 25, 2020

Related U.S. Application Data

(63) Continuation of application No. PCT/CN2020/071139, filed on Jan. 9, 2020.

(30) Foreign Application Priority Data

Jun. 28, 2019  (CN) .......................... 201910572179.0

(51) Int. Cl.
G06F 16/23 (2019.01)
H04L 9/06 (2006.01)
G06F 16/22 (2019.01)

(52) U.S. Cl.
CPC ...... G06F 16/2379 (2019.01); G06F 16/2246 (2019.01); H04L 9/0637 (2013.01); H04L 9/0643 (2013.01); H04L 2209/38 (2013.01)

(58) Field of Classification Search
CPC .................................................. G06F 16/2246
See application file for complete search history.

(56) References Cited

U.S. PATENT DOCUMENTS

2018/0145836 A1* 5/2018 Saur ................... G06Q 20/3829
2018/0183768 A1* 6/2018 Lobban ................. H04L 63/061
(Continued)

FOREIGN PATENT DOCUMENTS

CN  107239940  10/2017
CN  107294709  10/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

Primary Examiner — Mark D Featherstone
Assistant Examiner — Tony Wu
(74) Attorney, Agent, or Firm — Fish & Richardson P.C.

(57) ABSTRACT

This disclosure relates to blockchain-based transaction processing. In one aspect, a method includes obtaining pieces of transaction data. At least a portion of the pieces of transaction data have a respective group identifier that identifies a node group for the piece of transaction data. Each node group includes multiple blockchain nodes. Pieces of transaction data that have a same first group identifier that identifies a first node group are identified in the obtained pieces of transaction data. The pieces of transaction data are packaged into a first packaging result based on the pieces of transaction data having the same first group identifier. The first packaging result is submitted to a blockchain for storage.

14 Claims, 4 Drawing Sheets

(56) References Cited

U.S. PATENT DOCUMENTS

| | | |
|---|---|---|
| 2018/0293556 A1 | 10/2018 | Hyun et al. |
| 2019/0220857 A1* | 7/2019 | Black ................. G06Q 20/0855 |
| 2019/0268142 A1* | 8/2019 | Leker .................... H04L 63/126 |
| 2020/0005388 A1* | 1/2020 | Lim ....................... H04L 9/3247 |
| 2020/0067697 A1* | 2/2020 | Puddu ................... H04L 9/0637 |
| 2020/0076571 A1* | 3/2020 | Natarajan ............. H04L 9/0637 |

FOREIGN PATENT DOCUMENTS

| | | |
|---|---|---|
| CN | 109447648 | 3/2019 |
| CN | 109598598 | 4/2019 |
| CN | 109660601 | 4/2019 |
| CN | 109684375 | 4/2019 |
| CN | 109710617 | 5/2019 |
| CN | 109903026 | 6/2019 |
| CN | 109934709 | 6/2019 |
| CN | 110415117 | 11/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/071139, dated Apr. 9, 2020, 23 pages (with machine translation).

* cited by examiner

BLOCKCHAIN-BASED TRANSACTION PROCESSING

CROSS-REFERENCE TO RELATED APPLICATIONS

This application is a continuation of PCT Application No. PCT/CN2020/071139, filed on Jan. 9, 2020, which claims priority to Chinese Patent Application No. 201910572179.0, filed on Jun. 28, 2019, and each application is hereby incorporated by reference in its entirety.

TECHNICAL FIELD

Implementations of the present specification relate to the field of computer technologies, and in particular, to blockchain-based transaction processing.

BACKGROUND

Blockchain technology is a distributed database technology. By using cryptography and a consensus mechanism, blockchain technology ensures that data cannot be tampered with or forged. As computer and Internet technologies develop, blockchain technology is popular due to its advantages such as decentralization, openness and transparency, tamper-resistance, and trustworthiness. It has been widely used in numerous scenarios such as smart contract, securities transaction, e-commerce, the Internet of Things, social communication, file storage, proof of existence, identity verification, and equity crowdfunding.

In the related technology, when the blockchain is applied to the above-mentioned scenario, because each piece of transaction data needs to be sent to the blockchain for storage, the quantity of transactions may be disclosed.

SUMMARY

An objective of the implementations of the present specification is to provide blockchain-based transaction processing methods and devices and electronic devices, so that the quantity of transactions can be hidden.

To achieve the previous objective, one or more implementations of the present specification provide the following technical solutions.

According to a first aspect of one or more implementations of the present specification, a blockchain-based transaction processing method is provided, including: obtaining a plurality of pieces of transaction data, where the plurality of pieces of transaction data have a same group identifier, the group identifier is used to identify a node group, and the node group includes a plurality of blockchain nodes; packaging the plurality of pieces of transaction data to obtain a first packaging result; and submitting the first packaging result to a blockchain for storage.

According to a second aspect of one or more implementations of the present specification, a blockchain-based transaction processing device is provided, including: an acquisition unit, configured to obtain a plurality of pieces of transaction data, where the plurality of pieces of transaction data have a same group identifier, the group identifier is used to identify a node group, and the node group includes a plurality of blockchain nodes; a packaging unit, configured to package the plurality of pieces of transaction data to obtain a first packaging result; and a submitting unit, configured to submit the first packaging result to a blockchain for storage.

According to a third aspect of one or more implementations of the present specification, an electronic device is provided, including: a memory, configured to store computer instructions; and a processor, configured to execute the computer instructions to implement the method steps according to the first aspect.

As can be seen from the technical solutions provided in the foregoing implementations of the present specification, in the implementations of the present specification, the blockchain node can hide the real quantity of transactions by packaging a plurality of pieces of transaction data with the same group identifier.

BRIEF DESCRIPTION OF DRAWINGS

To describe the technical solutions in the implementations of the present specification or in the prior art more clearly, the following outlines the accompanying drawings for illustrating such technical solutions. Clearly, the accompanying drawings outlined below are some implementations of the present specification and a person skilled in the art can derive other drawings from such accompanying drawings without creative efforts.

DESCRIPTION OF IMPLEMENTATIONS

The technical solutions in the implementations of the present specification are described below clearly and comprehensively with reference to the accompanying drawings in the implementations of the present specification. Clearly, the described implementations are merely some of the implementations of the present specification, rather than all of the implementations. Based on the implementations of the present specification, a person skilled in the art can obtain other implementations without making creative efforts, which all fall within the scope of the present specification.

Transaction data can include transaction data in a narrow sense and transaction data in a broad sense. The transaction data in a narrow sense includes transaction data that enables value transfer, such as transaction data of a transfer transaction. The transaction data in a broad sense includes service data that can realize service intents, such as rentals, certificates, vehicle scheduling, insurance claiming, etc.

The transaction data can include private transaction data and non-private transaction data. Private transaction data is transaction data that is visible only to blockchain nodes in a node group. The private transaction data can include a group identifier of the node group. The non-private transaction data is transaction data visible to each blockchain node in the blockchain network. Non-private transaction data does not include the group identifier of the node group. The node groups are described in detail in a subsequent process.

The present specification provides an implementation of a blockchain-based transaction processing system.

The blockchain can be a distributed ledger that organizes a plurality of data blocks in a chain structure in chronological order and ensures security, traceability and tamper-resistance by using a cryptographic algorithm. The blockchain can be a public blockchain, a consortium blockchain, or a private blockchain.

The transaction processing system can include a blockchain network. The blockchain network can include a peer-to-peer network (P2P) network, etc. The blockchain network can include a plurality of blockchain nodes, and the plurality of blockchain nodes jointly maintain the distributed ledger. The plurality of blockchain nodes can belong to a plurality of institutions (or users or user groups), and each institution can include at least one blockchain node. Blockchain nodes of two or more institutions can form a node group. For example, in some cases, content of a transaction between the two institutions need to kept unknown to other institutions, then the blockchain nodes of the two institutions can form a node group. The blockchain network can include a plurality of node groups. Each node group can include a plurality of blockchain nodes, and can have a corresponding node identifier. A group identifier is used to identify a node group. Each blockchain node in a node group can have a group identifier of the node group. It should be noted that a blockchain node can be located in one or more node groups. As such, a blockchain node can have one or more group identifiers.

The transaction processing system can further include a client. The client can be, for example, a device such as a service server, a mobile phone, a tablet computer, or a personal computer; or can be a system that includes a plurality of devices, for example, a server cluster that includes a plurality of service servers. In the blockchain network, each blockchain node can correspond to at least one client. The client can communicate with a corresponding blockchain node, and can have the group identifier of the node group in which the blockchain node is located. It is worthwhile to note that a client can correspond to at least one blockchain node. When a client corresponds to a plurality of blockchain nodes, the plurality of blockchain nodes can be located in one or more node groups.

Figure 1:
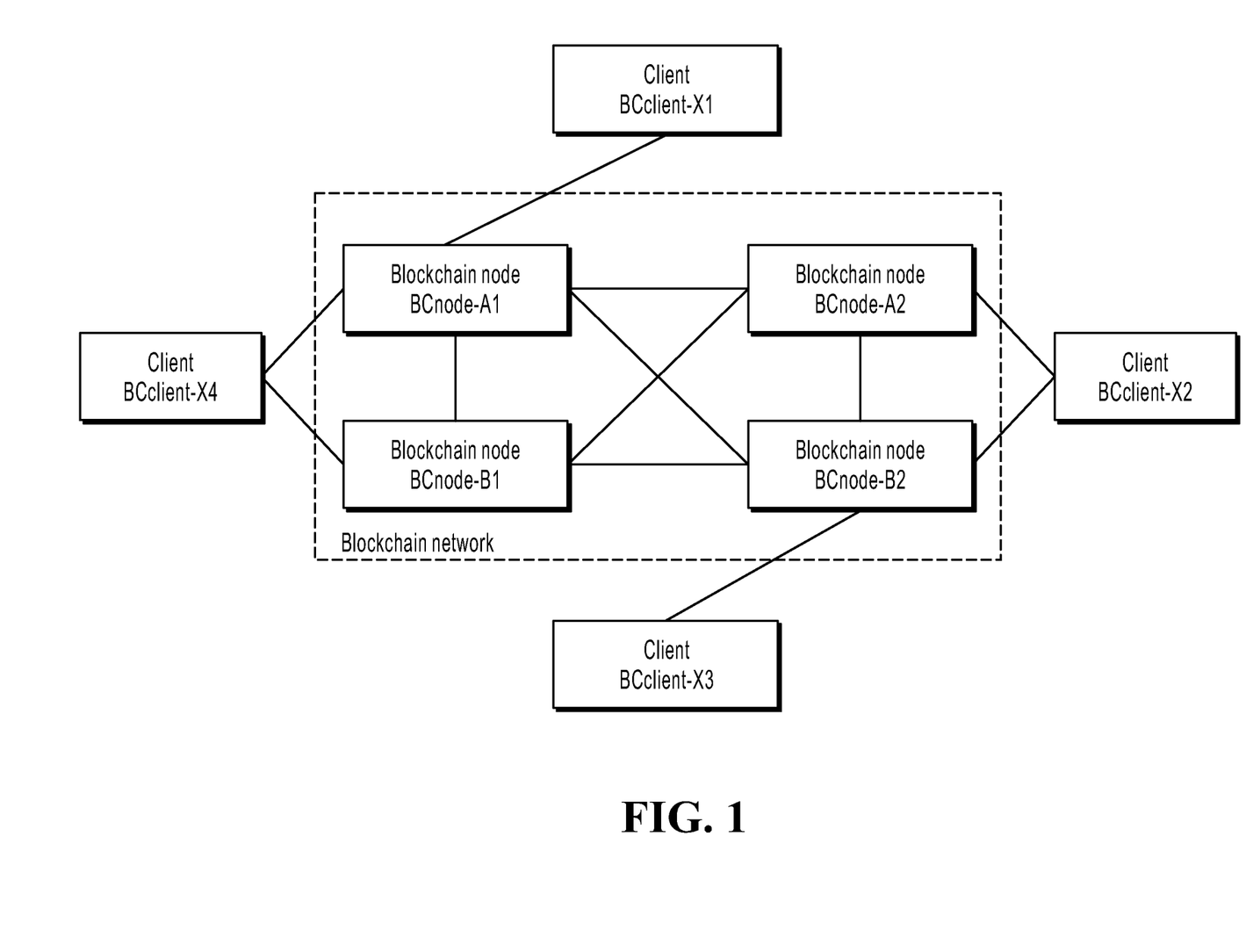
FIG. 1 is a schematic diagram illustrating a functional structure of a transaction processing system, according to an implementation of the present specification.

FIG. 1 is a schematic diagram illustrating a transaction processing system. Refer to FIG. 1. The transaction processing system can include a blockchain network. The blockchain network can include blockchain nodes BCnode-A1, BCnode-A2, BCnode-B1, and BCnode-B2. The blockchain network can include a node group A and a node group B, the node group A can include blockchain nodes BCnode-A1 and BCnode-A2, and the node group B can include blockchain nodes BCnode-B1 and BCnode-B2. The transaction processing system can further include clients BCclient-X1, BCclient-X2, BCclient-X3, and BCclient-X4. Client BCclient-X1 can communicate with blockchain node BCnode-A1; client BCclient-X2 can communicate with blockchain nodes BCnode-A2 and BCnode-B2; client BCclient-X3 can communicate with blockchain node BCnode-B2; and client BCclient-X4 can communicate with blockchain nodes BCnode-A1 and BCnode-B1.

The transaction processing system can process non-private transaction data. Specifically, the client can create non-private transaction data, and can send the created non-private transaction data to a corresponding blockchain node. The blockchain node can receive the non-private transaction data, and can submit the non-private transaction data to a blockchain for storage. Specifically, the blockchain node can store the non-private transaction data in its own transaction data pool; and can broadcast the non-private transaction data to the blockchain network, so that other blockchain nodes in the blockchain network can receive the non-private transaction data and store the non-private transaction data in their own transaction data pools. In some implementations, when a consensus trigger condition (for example, after a specific time period) is satisfied, one of the blockchain nodes in the blockchain network can be selected as a consensus blockchain node based on a consensus mechanism. The consensus blockchain node can obtain at least one piece of transaction data from its own transaction data pool; can construct data blocks based on the obtained transaction data; and can assemble the constructed data blocks onto the blockchain as new data blocks.

The transaction processing system can also process private transaction data. Specifically, the client can create private transaction data, and can send the created private transaction data to a corresponding blockchain node. The blockchain node can receive private transaction data; can package a plurality of pieces of private transaction data with the same group identifier to obtain a packaging result; and can submit the packaging result to a blockchain for storage. Specifically, the blockchain node can store the packaging result in its own transaction data pool as transaction data; and can broadcast the packaging result to the blockchain network, so that other blockchain nodes in the blockchain network can receive the packaging result and store the packaging result in their own transaction data pools. When a consensus trigger condition (for example, after a specific time period) is satisfied, one of the blockchain nodes in the blockchain network can be selected as a consensus blockchain node based on a consensus mechanism. The consensus blockchain node can obtain at least one piece of transaction data from its own transaction data pool; can construct data blocks based on the obtained transaction data; and can assemble the constructed data blocks onto the blockchain as new data blocks.

Figure 2:
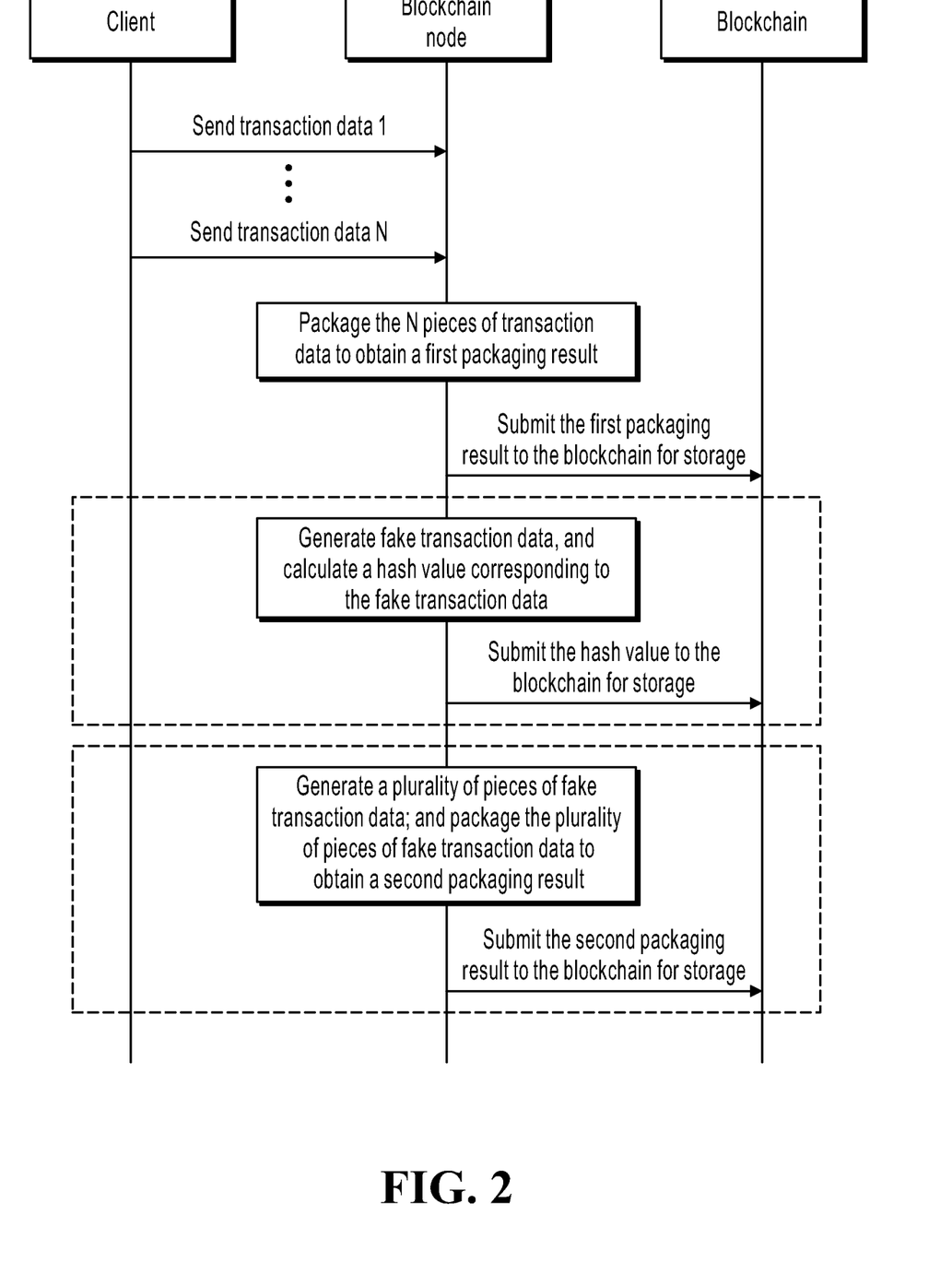
FIG. 2 is a flowchart illustrating a transaction processing method, according to an implementation of the present specification.
Figure 3:
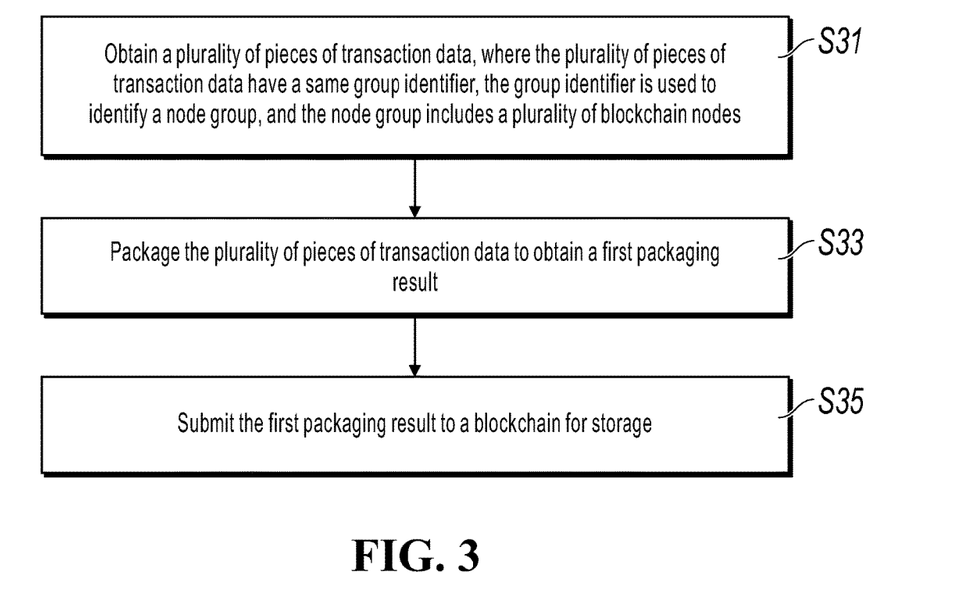
FIG. 3 is a flowchart illustrating a transaction processing method, according to an implementation of the present specification.

Refer to FIG. 2 and FIG. 3. The present specification provides an implementation of a blockchain-based transaction processing method. The present implementation can be applied to the blockchain node, and can include the following steps:

Step S31: Obtain a plurality of pieces of transaction data, where the plurality of pieces of transaction data have a same group identifier, the group identifier is used to identify a node group, and the node group includes a plurality of blockchain nodes.

In some implementations, the transaction data can be private transaction data. The transaction data can include a group identifier of a node group. The node group can include a blockchain node (hereafter referred to as a target blockchain node) and at least one other blockchain node for executing the implementation, and both the target blockchain node and the at least one other blockchain node can have the group identifier. The plurality of pieces of transaction data can be received from one or more clients.

In some implementations, the target blockchain node can correspond to at least one client. The at least one client can create a plurality of pieces of transaction data; and can send the plurality of pieces of transaction data to the target blockchain node. The target blockchain node can receive the plurality of pieces of transaction data.

In some applications, the target blockchain node can store the received transaction data in a transaction data pool (hereafter referred to as the first transaction data pool). The first transaction data pool can include at least one piece of transaction data to be packaged, and the target blockchain node can obtain N pieces of transaction data from the first transaction data pool, where N is a natural number greater than or equal to 2. N can be a predetermined number or a random number. In some implementations, all pieces of transaction data in the first transaction data pool have the same group identifier. The target blockchain node can directly obtain N pieces of transaction data from the first transaction data pool. In some other implementations, different pieces of transaction data in the first transaction data pool have different group identifiers. The target blockchain node can detect a group identifier in transaction data, and then can obtain N pieces of transaction data with the same group identifier from the first transaction data pool.

When a first predetermined condition is satisfied, the target blockchain node can obtain N pieces of transaction data from the first transaction data pool. The first predetermined condition can include at least one of the following: A quantity of pieces of transaction data in the first transaction data pool reaches a predetermined quantity, and a time interval that has elapsed after the transaction data is last packaged reaches a predetermined threshold.

Step S33: Package the plurality of pieces of transaction data to obtain a first packaging result.

In some implementations, by packaging the plurality of pieces of transaction data, the real quantity of transactions can be hidden to prevent blockchain nodes outside the node group from knowing the real quantity of transactions; and the transaction data can be encrypted to prevent blockchain nodes outside the node group from knowing the transaction content.

In some implementations, the target blockchain node can encrypt the plurality of pieces of transaction data as a whole, and the first packaging result can include an encryption result. Which method is used for encryption is not specifically limited in this specification. For example, the target blockchain node can encrypt the plurality of pieces of transaction data in a symmetric encryption method. Specifically, the target blockchain node can generate a symmetric key; can encrypt the plurality of pieces of transaction data by using the symmetric key. For another example, the target blockchain node can alternatively encrypt the plurality of pieces of transaction data in an asymmetric encryption method. Specifically, the target blockchain node can generate a public-private key pair; and can encrypt the plurality of pieces of transaction data using a public key in the public-private key pair.

Figure 4:
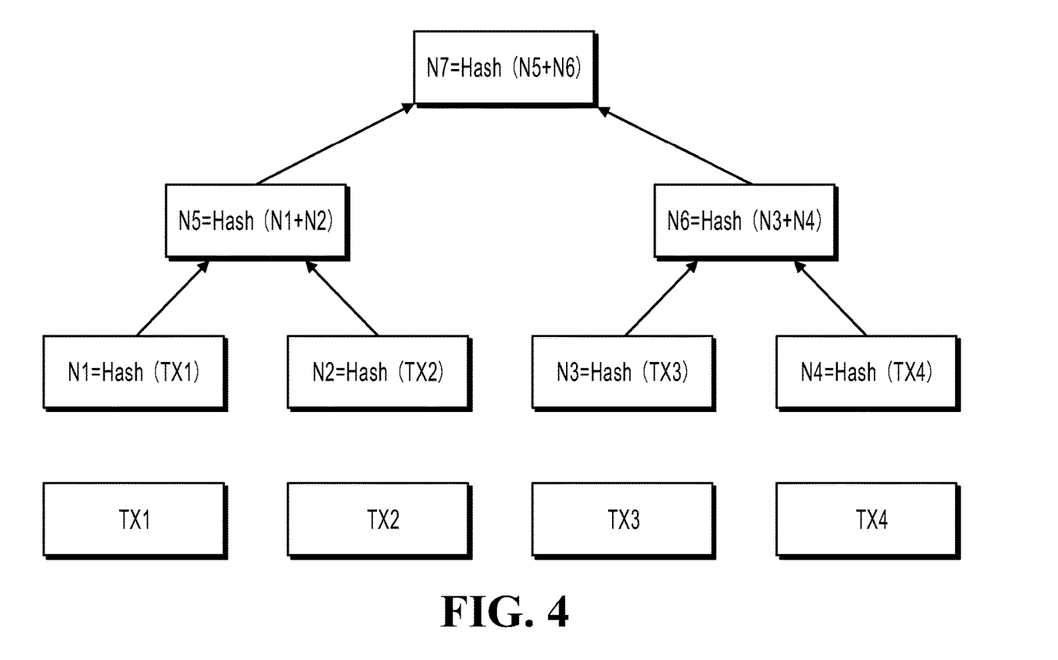
FIG. 4 is a schematic diagram illustrating a Merkle tree, according to an implementation of the present specification.

In some implementations, the target blockchain node can construct a Merkle Tree based on the plurality of pieces of transaction data, and the first packaging result can include a root of the Merkle Tree. The Merkle tree is a type of tree in a data structure. Specifically, the Merkle tree can be a binary tree or a multiway tree. FIG. 4 is a schematic diagram illustrating a Merkle tree. Refer to FIG. 4. The target blockchain node can calculate the hash values N1=Hash (TX1), N2=Hash (TX2), N3=Hash (TX3), and N4=Hash (TX4) of the transaction data TX1, TX2, TX3, and TX4 respectively; can calculate the hash value N5=Hash (N1+N2) of N1 and N2; can calculate the hash value N6=Hash (N3+N4) of N3 and N4; and can calculate the hash value N7=Hash (N5+N6) of N5 and N6. The target blockchain node can use hash values N1, N2, N3 and N4 as leaf nodes of the Merkle tree, use the hash values N5 and N6 nodes as other nodes other than the leaf nodes and the root node of the Merkle tree, and use the Hash value N7 as the root node of the Merkle tree, to construct the Merkle tree.

Step S35: Submit the first packaging result to a blockchain for storage.

In some implementations, the target blockchain can submit the first packaging result to the blockchain for storage. Specifically, the target blockchain node can store the first packaging result in its own second transaction data pool as transaction data; and can broadcast the first packaging result to the blockchain network, so that other blockchain nodes in the blockchain network can receive the first packaging result and store the first packaging result in their own second transaction data pools as transaction data. When a consensus trigger condition (for example, after a specific time period) is satisfied, one of the blockchain nodes in the blockchain network can be selected as a consensus blockchain node based on a consensus mechanism. The consensus blockchain node can obtain at least one piece of transaction data from its second transaction data pool; construct data blocks based on the obtained transaction data; and can assemble the constructed data blocks onto the blockchain as new data blocks.

The target blockchain node can further submit the first packaging result and the group identifier of the node group as a whole to the blockchain for storage. A specific submission process is similar to a process of submitting the first packaging result to the blockchain, and details are omitted here for simplicity. As such, the blockchain nodes in the blockchain network can identify the node group to which the first packaging result belongs to.

In some implementations, the target blockchain node can encrypt the plurality of pieces of transaction data as a whole. As such, the target blockchain node can send the encryption result and a decryption key to other blockchain nodes in the node group through an off-chain channel. Other blockchain nodes in the node group can receive the encryption result and the decryption key; and can decrypt the encryption result by using the decryption key. As such, the transaction content of the plurality of pieces of transaction data can be visible only to the blockchain nodes in the node group; and other blockchain nodes in the node group can verify the plurality of pieces of transaction data.

The off-chain channel can include communication methods other than blockchain networks such as the Internet, intranet, short-range wireless communications (such as Bluetooth, IrDA, Wi-Fi, Ultra Wide Band, Zigbee, and Near Field Communication (NFC)).

In some applications, if decryption succeeds, other blockchain nodes in the node group consider that the plurality of pieces of transaction data are valid; or if decryption fails, other blockchain nodes in the node group consider that the plurality of pieces of transaction data are invalid.

In some applications, the decryption key can vary with the encryption methods. For example, the target blockchain node can encrypt the plurality of pieces of transaction data by using a symmetric key. Then, the decryption key can include the symmetric key. For another example, the target blockchain node can encrypt the plurality of pieces of transaction data by using a public key in a public-private key pair. Then, the decryption key can include a private key in the public-private key pair.

In some implementations, the target blockchain node can construct a Merkle tree based on the plurality of pieces of transaction data. As such, the target blockchain node can send the root of the Merkle tree and the plurality of pieces of transaction data to other blockchain nodes in the node group through an off-chain channel. Other blockchain nodes in the node group can receive the root of the Merkle tree and the plurality of pieces of transaction data; and can verify the plurality of pieces of transaction data by using the root of the Merkle tree. As such, the transaction content of the plurality of pieces of transaction data can be visible only to the blockchain nodes in the node group; and other blockchain nodes in the node group can verify the plurality of pieces of transaction data.

In some applications, other blockchain nodes in the node group can construct a new Merkle tree based on the plurality of pieces of transaction data; and can compare the root of the new Merkle tree with the received root. If the two roots are the same, other blockchain nodes consider that the plurality of pieces of transaction data are valid; or if the two roots are different, other blockchain nodes consider that the plurality of pieces of transaction data are invalid.

In some implementations, the target blockchain node can further hide the real quantity of transactions by submitting fake transaction data to the blockchain. The fake transaction data can include transaction data with empty transaction content.

In some implementations, the target blockchain node can generate fake transaction data; can calculate a hash value corresponding to the fake transaction data; and can submit the hash value to the blockchain for storage when a second predetermined condition is satisfied. The fake transaction data can include a group identifier of the node group. The second predetermined condition can include that a time interval that elapses after each blockchain node in the node group submits transaction data to the blockchain for the last time reaches a predetermined threshold. A specific submission process is similar to the process of submitting the first packaging result to the blockchain, and details are omitted here for simplicity.

The target blockchain node can send the hash value and the fake transaction data to other blockchain nodes in the node group through an off-chain channel. Other blockchain nodes in the node group can receive the hash value and the fake transaction data; and can verify the fake transaction data by using the hash value. As such, the transaction content of the fake transaction data can be visible only to the blockchain nodes in the node group; and other blockchain nodes in the node group can verify the fake transaction data.

The target blockchain node can further submit the hash value and the group identifier of the node group as a whole to the blockchain for storage. A specific submission process is similar to the process of submitting the first packaging result to the blockchain, and details are omitted here for simplicity. As such, the blockchain nodes in the blockchain network can identify the node group to which the hash value on the blockchain network belongs to.

In some implementations, the target blockchain node can generate a plurality of pieces of fake transaction data; can package the plurality of pieces of fake transaction data; and can submit the plurality of pieces of fake transaction data to the blockchain for storage when the second predetermined condition is satisfied. The plurality of pieces of fake transaction data all have the group identifier. A specific submission process is similar to the process of submitting the first packaging result to the blockchain, and details are omitted here for simplicity. In addition, a process of obtaining the second packaging result is similar to the process of obtaining the first packaging result, and details are omitted here for simplicity.

The target blockchain node can further submit the second packaging result and the group identifier of the node group as a whole to the blockchain for storage. A specific submission process is similar to the process of submitting the first packaging result to the blockchain, and details are omitted here for simplicity. As such, the blockchain nodes in the blockchain network can identify the node group to which the second packaging result belongs to.

According to the blockchain-based transaction processing method provided in some implementations, the target blockchain node can hide the real quantity of transactions by packaging the plurality of pieces of transaction data with the same group identifier, so that blockchain nodes outside the node group cannot know the real quantity of transactions.

Figure 5:
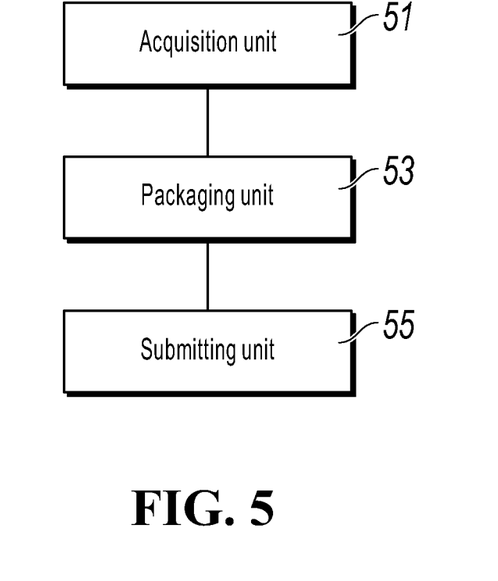
FIG. 5 is a schematic diagram illustrating a functional structure of a transaction processing device, according to an implementation of the present specification.

Refer to FIG. 5. The present specification provides an implementation of a blockchain-based transaction processing device. The present implementation can be applied to a blockchain node, and can specifically include the following units: an acquisition unit 51, configured to obtain a plurality of pieces of transaction data, where the plurality of pieces of transaction data have a same group identifier, the group identifier is used to identify a node group, and the node group includes a plurality of blockchain nodes; a packaging unit 53, configured to package the plurality of pieces of transaction data to obtain a first packaging result; and a submitting unit 55, configured to submit the first packaging result to a blockchain for storage.

Figure 6:
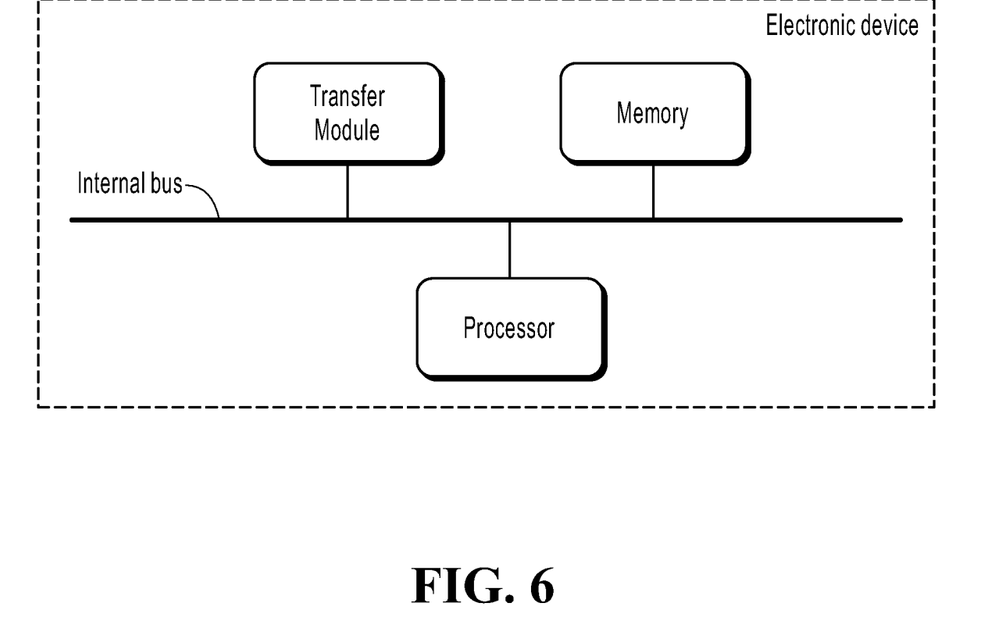
FIG. 6 is a schematic diagram illustrating a functional structure of an electronic device, according to an implementation of the present specification.

The following describes one implementation of an electronic device provided in the present specification. FIG. 6 is a schematic diagram illustrating a hardware structure of an electronic device provided in an implementation of the present specification. As shown in FIG. 6, the electronic device can include one or more processors (only one processor is shown in the figure), one or more memories, and one or more transfer modules. Certainly, a person of ordinary skill in the art should understand that the hardware structure shown in FIG. 6 is merely an example and does not constitute any limitation on the hardware structure of the electronic device. In practice, the electronic device can include more or less components than those shown in FIG. 6; or have a configuration different than that shown in FIG. 6.

The memory can include a high-speed random access memory; or can include a nonvolatile memory, such as one or more magnetic storage devices, a flash memory, or another nonvolatile solid-state memory. Certainly, the memory can alternatively include a remote network memory. The remote network memory can be connected to the electronic device through the Internet, an enterprise intranet, a local area network, a mobile communications network, etc. The memory can be configured to store a program instruction or module of application software, for example, a program instruction or module of the implementation corresponding to FIG. 3 in the present specification.

The processor can be implemented by using any appropriate method. For example, the processor can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. The processor can read and execute program instructions or modules in the memory.

The transfer module can be configured to transfer data through a network, for example, through the Internet, an enterprise intranet, a local area network, or a mobile communications network.

It is worthwhile to note that the implementations of the present specification are described in a progressive way. For same or similar parts of the implementations, mutual references can be made to the implementations. Each implementation focuses on a difference from the other implementations. In particular, the device implementation and the electronic device implementation are basically similar to the method implementation, and therefore are described briefly; for related parts, references can be made to the related descriptions in the method implementation.

In addition, it should be understood that, after reading the present specification, a person skilled in the art can freely combine some or all of the implementations in the present specification without creative efforts, and such combinations shall fall within the protection scope of the present specification.

In the 1990s, whether technology improvement is hardware improvement (for example, improvement of a circuit structure, such as a diode, a transistor, or a switch) or software improvement (improvement of a method procedure) can be obviously distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, device, module, or unit illustrated in the previous implementations can be implemented by using a computer chip or an entity, or can be implemented by using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

It can be determined from descriptions of the implementations that a person skilled in the art can clearly understand that the present specification can be implemented by using software in addition to a necessary universal hardware platform. Based on such an understanding, the technical solutions in the present specification essentially or the part contributing to the existing technology can be implemented in a form of a software product. The software product can be stored in a storage medium, such as a ROM/RAM, a magnetic disk, or an optical disc, and includes several instructions for instructing a computer device (such as a personal computer, a server, or a network device) to perform the methods described in the implementations or in some parts of the implementations of the present specification.

The present specification can be used in many general-purpose or dedicated computer system environments or configurations, for example, a personal computer, a server computer, a handheld device, a portable device, a tablet device, a mobile communications terminal, a multiprocessor system, a microprocessor system, a programmable electronic device, a network PC, a small computer, a mainframe computer, and a distributed computing environment including any of the above systems or devices.

The present specification can be described in the general context of computer executable instructions executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

Although the present specification is described by using the implementations, a person of ordinary skill in the art knows that many modifications and variations of the present specification can be made without departing from the spirit of the present specification. It is expected that the claims include these modifications and variations without departing from the spirit of the present specification.

What is claimed is:

1. A computer-implemented method, comprising:
obtaining, from a plurality of clients, pieces of transaction data comprising pieces of non-private transaction data visible to each blockchain node in a blockchain and pieces of private transaction data, wherein:
each piece of private transaction data has a corresponding group identifier that identifies a corresponding node group for the piece of transaction data and each piece of public transaction data does not have a corresponding group identifier;
each node group comprises a plurality of blockchain nodes; and
each piece of private transaction data is only visible to the plurality of blockchain nodes in the corresponding node group identified by the group identifier corresponding to the piece of private transaction data;
for each particular group identifier:
obscuring a quantity of transactions corresponding to the particular group identifier submitted to the blockchain, the obscuring comprising:
identifying, in the obtained pieces of transaction data, a plurality of pieces of private transaction data that have the particular group identifier that identifies a particular node group, wherein identifying the plurality of pieces of private transaction data that have the particular group identifier comprises:
  collecting, in a transaction data pool, each piece of private transaction data,
  identifying, as the plurality of pieces of private transaction data, the pieces of private transaction data in the transaction data pool that have the particular group identifier;
  generating a respective packaging result for the particular group identifier, the generating including packaging the plurality of pieces of private transaction data having the particular group identifier into the respective packaging result in response to the plurality of pieces of private transaction data having the particular group identifier; and
  submitting, to the blockchain for storage, fake transaction data comprising the particular group identifier and a hash of empty transaction content for a fake transaction;
submitting each packaging result and, for each packaging result, the particular group identifier for the packaging result, to the blockchain for storage, wherein at least one packaging result comprises pieces of private transaction data obtained from multiple clients; and
submitting each unpackaged piece of public transaction data to the blockchain for storage.

2. The computer-implemented method of claim 1, wherein:
  packaging the plurality of pieces of private transaction data having the particular group identifier into the respective packaging result comprises encrypting the plurality of pieces of private transaction data as a whole to obtain an encryption result; and
  submitting each packaging result to the blockchain for storage comprises submitting the encryption result to the blockchain for storage.

3. The computer-implemented method of claim 1, wherein:
  packaging the plurality of pieces of private transaction data comprises constructing a Merkle tree based on the plurality of pieces of private transaction data, wherein the Merkle tree comprises a root node comprising a hash value; and
  submitting each packaging result to the blockchain for storage comprises submitting the root node of the Merkle tree to the blockchain for storage.

4. The computer-implemented method of claim 1, wherein submitting, to the blockchain for storage, the fake transaction data comprising the particular group identifier and the hash of the empty transaction content for the fake transaction comprises:
  generating the fake transaction data;
  calculating a hash value corresponding to the fake transaction data; and
  in response to a predetermined condition being satisfied, submitting the hash value to the blockchain for storage.

5. The computer-implemented method of claim 1, further comprising:
  for each particular group identifier:
    generating a plurality of pieces of fake transaction data, wherein each piece of fake transaction data in the plurality of pieces of fake transaction data has the particular group identifier;
    packaging the plurality of pieces of fake transaction data into a second packaging result; and
    in response to a predetermined condition being satisfied, submitting the second packaging result to the blockchain for storage.

6. The computer-implemented method of claim 1, further comprising:
  determining that a consensus trigger condition is satisfied;
  selecting a given blockchain node as a consensus blockchain node;
  obtaining, by the given blockchain node, at least one piece of transaction data from a second transaction data pool of the given blockchain node;
  constructing data blocks based on the at least one piece of transaction data and the plurality of pieces of private transaction data of at least one packaging result; and
  assembling the constructed data blocks onto the blockchain as new data blocks.

7. The computer-implemented method of claim 2, wherein the method is performed by a target blockchain node, and the target blockchain node is in the particular node group, the method further comprising:
  sending the encryption result and a decryption key to other blockchain nodes in the particular node group through an off-chain channel, wherein the other blockchain nodes verify the plurality of pieces of private transaction data using the decryption key.

8. The computer-implemented method of claim 3, wherein the method is performed by a target blockchain node, and the target blockchain node is in the particular node group, the method further comprising:
  sending the root node of the Merkle tree and the plurality of pieces of private transaction data to other blockchain nodes in the particular node group through an off-chain channel, wherein the other blockchain nodes verify the plurality of pieces of private transaction data using the hash value of the root node.

9. The computer-implemented method of claim 4, wherein the predetermined condition comprises a time interval reaching a predetermined threshold, wherein the time interval begins after each blockchain node in the particular node group submits transaction data to the blockchain for a last time.

10. The computer-implemented method of claim 5, wherein submitting the second packaging result to the blockchain for storage comprises submitting the second packaging result and the particular group identifier to the blockchain for storage.

11. A non-transitory, computer-readable medium storing one or more instructions executable by a computer system to perform operations comprising:
  obtaining, from a plurality of clients, pieces of transaction data comprising pieces of non-private transaction data visible to each blockchain node in a blockchain and pieces of private transaction data, wherein:
    each piece of private transaction data has a corresponding group identifier that identifies a corresponding node group for the piece of transaction data and each piece of public transaction data does not have a corresponding group identifier;
    each node group comprises a plurality of blockchain nodes; and
    each piece of private transaction data is only visible to the plurality of blockchain nodes in the corresponding node group identified by the group identifier corresponding to the piece of private transaction data;

for each particular group identifier:
obscuring a quantity of transactions corresponding to the particular group identifier submitted to the blockchain, the obscuring comprising:
identifying, in the obtained pieces of transaction data, a plurality of pieces of private transaction data that have the particular group identifier that identifies a particular node group, wherein identifying the plurality of pieces of private transaction data that have the particular group identifier comprises:
collecting, in a transaction data pool, each piece of private transaction data,
identifying, as the plurality of pieces of private transaction data, the pieces of private transaction data in the transaction data pool that have the particular group identifier;
generating a respective packaging result for the particular group identifier, the generating including packaging the plurality of pieces of private transaction data having the particular group identifier into the respective packaging result in response to the plurality of pieces of private transaction data having the particular group identifier; and
submitting, to the blockchain for storage, fake transaction data comprising the particular group identifier and a hash of empty transaction content for a fake transaction;
submitting each packaging result and, for each packaging result, the particular group identifier for the packaging result, to the blockchain for storage, wherein at least one packaging result comprises pieces of private transaction data obtained from multiple clients; and
submitting each unpackaged piece of public transaction data to the blockchain for storage.

12. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, from a plurality of clients, pieces of transaction data comprising pieces of non-private transaction data visible to each blockchain node in a blockchain and pieces of private transaction data, wherein:
each piece of private transaction data has a corresponding group identifier that identifies a corresponding node group for the piece of transaction data and each piece of public transaction data does not have a corresponding group identifier;
each node group comprises a plurality of blockchain nodes; and
each piece of private transaction data is only visible to the plurality of blockchain nodes in the corresponding node group identified by the group identifier corresponding to the piece of private transaction data;
for each particular group identifier:
obscuring a quantity of transactions corresponding to the particular group identifier submitted to the blockchain, the obscuring comprising:
identifying, in the obtained pieces of transaction data, a plurality of pieces of private transaction data that have the particular group identifier that identifies a particular node group, wherein identifying the plurality of pieces of private transaction data that have the particular group identifier comprises:
collecting, in a transaction data pool, each piece of private transaction data,
identifying, as the plurality of pieces of private transaction data, the pieces of private transaction data in the transaction data pool that have the particular group identifier;
generating a respective packaging result for the particular group identifier, the generating including packaging the plurality of pieces of private transaction data having the particular group identifier into the respective packaging result in response to the plurality of pieces of private transaction data having the particular group identifier; and
submitting, to the blockchain for storage, fake transaction data comprising the particular group identifier and a hash of empty transaction content for a fake transaction;
submitting each packaging result and, for each packaging result, the particular group identifier for the packaging result, to the blockchain for storage, wherein at least one packaging result comprises pieces of private transaction data obtained from multiple clients; and
submitting each unpackaged piece of public transaction data to the blockchain for storage.

13. The computer-implemented system of claim 12, wherein:
packaging the plurality of pieces of private transaction data having the particular group identifier into the respective packaging result comprises encrypting the plurality of pieces of private transaction data as a whole to obtain an encryption result; and
submitting each packaging result to the blockchain for storage comprises submitting the encryption result to the blockchain for storage.

14. The computer-implemented system of claim 12, wherein:
packaging the plurality of pieces of private transaction data comprises constructing a Merkle tree based on the plurality of pieces of private transaction data, wherein the Merkle tree comprises a root node comprising a hash value; and
submitting each packaging result to the blockchain for storage comprises submitting the root node of the Merkle tree to the blockchain for storage.

* * * * *